United States Patent
Yamaguchi et al.

(10) Patent No.: US 12,516,082 B2
(45) Date of Patent: Jan. 6, 2026

(54) METAL-CARBOHYDRATE COMPLEX

(71) Applicant: ARCZONE K.K., Tokyo (JP)

(72) Inventors: Eiichi Yamaguchi, Tokyo (JP); Hideki Iijima, Ootsu (JP)

(73) Assignee: ARCZONE K.K., Tokyo (JP)

( * ) Notice: Subject to any disclaimer, the term of this patent is extended or adjusted under 35 U.S.C. 154(b) by 615 days.

(21) Appl. No.: 17/915,822

(22) PCT Filed: Mar. 31, 2021

(86) PCT No.: PCT/JP2021/013857
§ 371 (c)(1),
(2) Date: Sep. 29, 2022

(87) PCT Pub. No.: WO2021/201109
PCT Pub. Date: Oct. 7, 2021

(65) Prior Publication Data
US 2023/0151051 A1 May 18, 2023

(30) Foreign Application Priority Data
Apr. 1, 2020 (JP) .................. 2020-066177

(51) Int. Cl.
*C07H 23/00* (2006.01)
(52) U.S. Cl.
CPC .................. *C07H 23/00* (2013.01)
(58) Field of Classification Search
None
See application file for complete search history.

(56) References Cited

U.S. PATENT DOCUMENTS

| | | | |
|---|---|---|---|
| 5,624,908 | A | 4/1997 | Bicher |
| 2003/0113194 | A1 | 6/2003 | Stafford et al. |
| 2008/0279781 | A1 | 11/2008 | Miura et al. |

FOREIGN PATENT DOCUMENTS

| | | |
|---|---|---|
| CN | 103502465 A | 1/2014 |
| CN | 108727451 A | 11/2018 |
| JP | 2007536016 A | 12/2007 |
| JP | 2021501832 A | 1/2021 |
| WO | 9428909 A1 | 12/1994 |
| WO | 2005110261 A2 | 11/2005 |
| WO | 2011107290 A1 | 9/2011 |
| WO | 2012133688 A1 | 10/2012 |
| WO | 2015056960 A1 | 4/2015 |
| WO | 2019084661 A1 | 5/2019 |

OTHER PUBLICATIONS

Navarro et al., Malaria Journal, Dec. 3, 2014; vol. 13, No. 471, pp. 1-8. (Year: 2014).*
Navarro et al., "Toward a Novel Metal-Based Chemotherapy against Tropical Diseases.7. Synthesis and in Vitro Antimalarial Activity of New Gold-Chloroquine Complexes", J. Med. Chem., Sep. 4, 2004; vol. 47, No. 21, pp. 5204-5209.
PCT International Preliminary Report on Patentability for International Application No. PCT/JP2021/013857; Date of Mailing, Oct. 23, 2021.
International Search Report corresponding to International Application PCT/JP2021/013857; Mailing Date, Jun. 15, 2021.
Issels, R.D. et al., "Effect of neoadjuvant chemotherapy plus regional hyperthermia on long-term outcomes among patients with localized high-risk soft tissue sarcoma", JAMA Oncology, vol. 4, No. 4, Apr. 2018 pp. 483-492.
Killock, D., "Local hyperthermia improves survival", Nature Reviews Clinical Oncology, Article 15, No. 266, 2018, 1 page.
Navarro, M. et al., "Metal-chloroquine derivatives as possible anti-malarial drugs: evaluation of anti-malarial activity and mode of action", Malaria Journal, vol. 13, No. 471, Dec. 3, 2014, pp. 1-8.
Ono K. et al., "L-Glucose: Another Path to Cancer Cells", Cancers, 12(4), Article No. 850, 2020, 27 pages.
Wu, B. et al., "Synthesis and Structure-Activity Relationship Study of Antimicrobial Auranofin against ESKAPE Pathogens", Journal of Medicinal Chemistry, vol. 63, No. 17, Dec. 31, 2019, pp. 7751-7768.
Benoit Bertrand et al., "New Gold(I) Organometallic Compounds with Biological Activity in Cancer Cells", European Journal of Inorganic Chemistry, Wiley-VCH Verlag, Wenheim, DE, vol. 2014, on. 27, May 13, 2014, p. 4532-p. 4536, XP072129657; 5 pages.
EPO Extended European Search Report for corresponding EP Application No. 21777929.7; Dated Mar. 26, 2024.

* cited by examiner

*Primary Examiner* — Traviss C Mcintosh, III
(74) *Attorney, Agent, or Firm* — CANTOR COLBURN LLP

(57) ABSTRACT

Provided is an L-glucose derivative represented by General Formula (1) below:

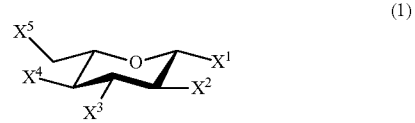

(1)

wherein $X^1$ represents a —$SAuR^1$ group, and $X^2$, $X^3$, $X^4$ and $X^5$ each independently represent an —$OR^2$ group, an —$NH_2$ group, or a fluorine atom; and $R^1$ represents a ligand and $R^2$ represents a hydrogen atom or an organic group.

13 Claims, 6 Drawing Sheets

METAL-CARBOHYDRATE COMPLEX

CROSS REFERENCE TO RELATED APPLICATIONS

This is the U.S. national stage of application No. PCT/JP2021/013857, filed on Mar. 31, 2021. Priority under 35 U.S.C. § 119 (a) and 35 U.S.C. § 365 (b) is claimed from Japanese Application No. 2020-066177, filed Apr. 1, 2020, the disclosure of which is also incorporated herein by reference.

TECHNICAL FIELD

The present invention relates to a metal-carbohydrate complex.

BACKGROUND ART

In recent years, hyperthermia (thermotherapy) has been attracting attention as a non-invasive therapeutic method for cancer. Hyperthermia is a method of improving the survival rate of patients by enhancing the effect of cancer treatments or by changing the environment around cancer cells (malignant tumor cells) by killing cancer cells through heating affected parts utilizing the fact that cancer cells are more susceptible to heat than normal cells (for example, refer to Non Patent Literature 1). Examples of heating methods in hyperthermia include a method for irradiating affected parts with radio waves (RF waves). This is called a high frequency hyperthermia treatment.

Incidentally, in the usual method for irradiating affected parts with radio waves, it is difficult to selectively heat cancer cells and surrounding normal cells are also heated. Therefore, there are problems such as poor energy efficiency and a heavy burden on patients. In response to the problem, Patent Literature 1 proposes a method in which the heating efficiency using RF waves is improved by guiding magnetic particles and the like to tumors (affected parts) as an RF absorption enhancer (sensitizing drug). As methods for guiding an RF absorption enhancer to tumors, a direct introduction method into tumors through injection or the like as a part of a fluid and a guiding method to affected parts using MRI have been proposed, for example.

CITATION LIST

Patent Literature

[Patent Literature 1] Japanese Unexamined Patent Publication No. 2007-536016

Non Patent Literature

[Non Patent Literature 1] Killock, D. Nature Reviews Clinical Oncology, 15:266, 2018

SUMMARY OF INVENTION

Technical Problem

However, in the methods in the related art such as Patent Literature 1, there is a problem that it is difficult to selectively guide an RF absorption enhancer only to tumors and it is difficult to induce an RF absorption enhancer into cancer cells in deep portions, especially pancreatic cancer cells.

Therefore, an object of the present invention is to provide a sensitizing drug which can be selectively incorporated into cancer cells and can selectively generate heat in a target site during a high frequency hyperthermia treatment.

In addition, a method using an anticancer agent is known as one of the general treatment methods for cancer. In general, anticancer agents act not only on cancer cells but also normal cells, resulting in strong side effects. How to reduce such side effects has become an issue in treating cancer. In response to the problem, molecular targeted drugs that identify molecules specifically expressed by cancer cells and suppress proliferation or metastasis of cancer cells have been attracting attention. The side effects due to classical anticancer agents are expected to be suppressed with molecular targeted drugs. However, in reality, molecules that are said to be specifically expressed by cancer cells are also expressed on normal cells, and molecular targeted drugs also act on molecules that are different from what is assumed, thereby causing considerable side effects. Needless to say, the human body is a collection of cells. As long as the human body is made up of cells, the cells require an energy source for their activities and a carbon source for their proliferation. Therefore, methods for identifying cancer by labeling molecules incorporated into cells instead of targeting molecules or proteins in our living bodies have been attracting attention again in recent years (Ono K. et al. Cancers 2020).

Incidentally, if there was a compound which had low toxicity to normal cells and was selectively incorporated into cancer cells to exhibit toxicity, it can be expected that side effects would be reduced. Therefore, another object of the present invention is to provide a compound which has low toxicity to normal cells and is selectively incorporated into cancer cells to exhibit toxicity.

Solution to Problem

The present inventors have conducted extensive studies to solve the above-described problems, and as a result, have found an L-glucose derivative represented by General Formula (1) below.

[Chem. 1]

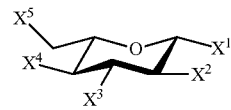

(1)

[In Formula (1), $X^1$ represents a —$SAuR^1$ group, and $X^2$, $X^3$, $X^4$ and $X^5$ each independently represent an —$OR^2$ group, an —$NH_2$ group, or a fluorine atom; and $R^1$ represents a ligand and $R^2$ represents a hydrogen atom or an organic group.]

Such an L-glucose derivative can be selectively incorporated into cancer cells as shown in Examples. In the presence of the L-glucose derivative, heating efficiency due to RF waves improves as shown in the Examples, so that the L-glucose derivative can function as a sensitizing drug. The L-glucose derivative has low toxicity to normal cells as shown in the Examples, and it is expected to have an effect of enhancing selectivity to cancer cells.

Although the reason why the L-glucose derivative of the present invention exhibits the above-described effect is not necessarily clear, considerations by the present inventors are shown below.

Although L-glucose is a molecule that is rarely seen in nature, it is an optical isomer of D-glucose which is glucose existing widely in nature. D-glucose is incorporated into cells via glucose transporters (GLUT and SGLT) present in cell membranes and serves as an energy source or a carbon source, while L-glucose is thought to be incapable of passing through the glucose transporters and hardly any is incorporated into normal cells.

On the other hand, at least a part of the L-glucose derivative of the present invention may be selectively incorporated into cancer cells.

In addition to this, the L-glucose derivative of the present invention contains gold atoms (Au) in its molecules, and therefore it is thought that a heating effect may be obtained. Furthermore, since the L-glucose derivative of the present invention contains gold atoms (Au) in its molecules, the gold atoms may exhibit significant toxicity to cancer cells when incorporated into cancer cells.

Advantageous Effects of Invention

According to the present invention, it is possible to provide a sensitizing drug which can be selectively incorporated into cancer cells and can selectively generate heat in a target site during a high frequency hyperthermia treatment. Furthermore, according to the present invention, it is possible to provide a compound which has low toxicity to normal cells and is selectively incorporated into cancer cells to exhibit toxicity.

DESCRIPTION OF EMBODIMENTS

Figure 1:
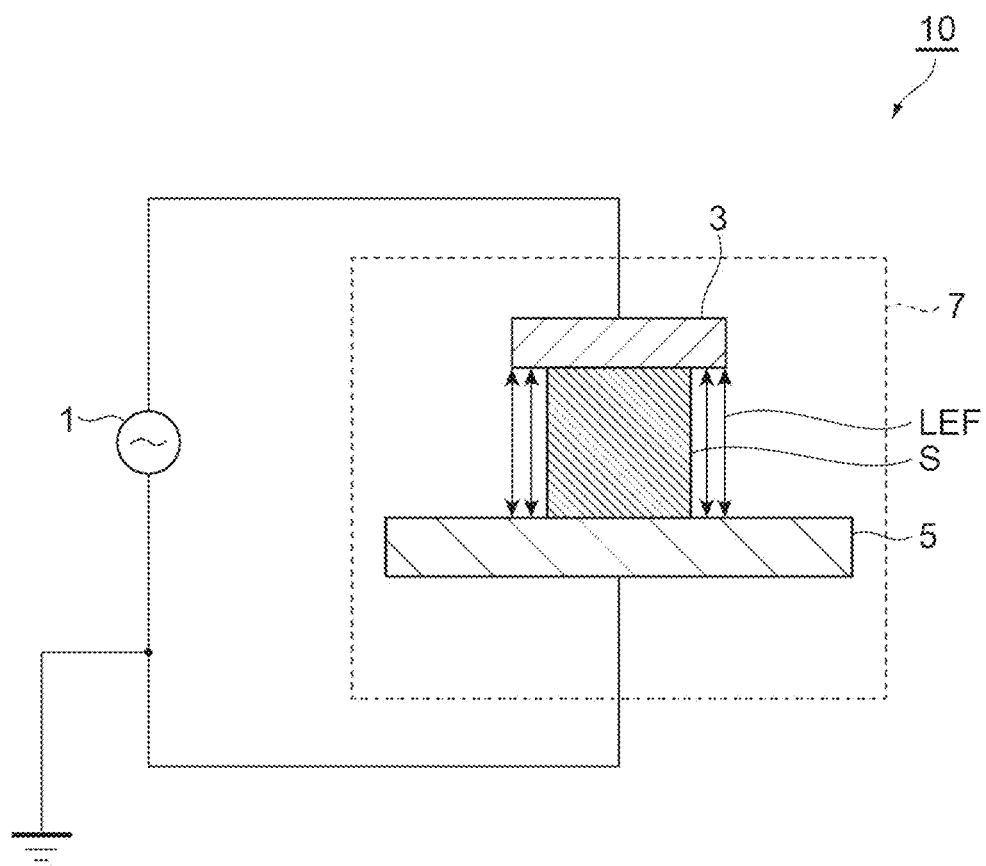
FIG. 1 is a schematic diagram illustrating an RF wave irradiation unit.

Hereinafter, a suitable embodiment of the present invention will be described in detail. However, the present invention is not limited to the following embodiment.

The L-glucose derivative of the present embodiment has a structure represented by General Formula (1) below.

[Chem. 2]

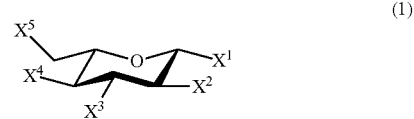

(1)

[In Formula (1), $X^1$ represents a —$SAuR^1$ group, and $X^2$, $X^3$, $X^4$ and $X^5$ each independently represent an —$OR^2$ group, an —$NH_2$ group, or a fluorine atom; and $R^1$ represents a ligand and $R^2$ represents a hydrogen atom or an organic group.]

There are D-form and L-form glucose derivatives, and the structure represented by General Formula (1) is an L-form glucose derivative. In addition, glucose derivatives may have anomeric isomers, that is, an anomer in which $X^1$ is oriented in the equatorial direction and an anomer in which $X^1$ is oriented in the axial direction. The L-glucose derivative of the present embodiment may be a mixture thereof.

Examples of ligands for $R^1$ include a phosphine ligand, a thiolate ligand, and an olefin ligand.

$R^1$ is preferably a phosphine ligand, more preferably a trialkylphosphine ligand, and still more preferably a triethylphosphine ligand.

Examples of organic groups for $R^2$ include an alkyl group, an alkenyl group, an alkynyl group, an aryl group, and an acyl group. These groups may have another substituent. The number of carbon atoms in an organic group can be, for example, 1 to 10, preferably 1 to 5, and more preferably 1 to 3.

$R^2$ is preferably a hydrogen atom, an alkyl group, or an acyl group, more preferably a hydrogen atom or an acyl group, and still more preferably a hydrogen atom or an acetyl group.

The L-glucose derivative represented by General Formula (1) can be synthesized, for example, from L-form sugars or derivatives thereof. Specific examples of L-form sugars or derivatives thereof include L-glucose, L-mannose, L-galactose, and 1,2:5,6-di-O-isopropylidene-α-L-glucofuranose.

Examples of methods for synthesizing the L-glucose derivative represented by General Formula (1) from L-form sugars or derivatives thereof include methods described in the Examples. Various derivatives can be synthesized by appropriately combining steps of the methods described in the Examples or by introducing a substituent through the well-known conventional methods.

The L-glucose derivative represented by General Formula (1) can be suitably used as a sensitizing drug for a high frequency hyperthermia treatment. Well-known conventional devices can be used for a high frequency hyperthermia treatment.

The L-glucose derivative represented by General Formula (1) can be administered before or during RF wave irradiation in a high frequency hyperthermia treatment.

The high frequency hyperthermia treatment in which the L-glucose derivative represented by General Formula (1) is used as a sensitizing drug can be effective for treating cancer, particularly for treating various kinds of cancer such as pancreatic cancer, brain tumors, breast cancer, and uterine cancer.

The use of the L-glucose derivative represented by General Formula (1) can be effective for treating cancer, particularly for treating various kinds of cancer such as pancreatic cancer, brain tumors, breast cancer, and uterine cancer.

The L-glucose derivative represented by General Formula (1) can be administered, for example, as an oral agent (such as tablets, granules, powders, capsules, and syrups), sublingual tablets, injections (for intravenous administration, intramuscular administration, subcutaneous administration, intraperitoneal administration, and epidural administration), or in the forms of direct local application to the cervix, oral cavity, skin, and the like.

EXAMPLES

Hereinafter, the present invention will be described more specifically based on the Examples. However, the present invention is not limited to the Examples. Structures of synthesized compounds are identified using UPLC-MS, $^1$H-NMR, $^{13}$C-NMR, and the like. The relationship between abbreviations and compound names used in the Examples is shown below.

KSAc: S-Potassium thioacetate
NaOMe: Sodium methoxide
Et$_3$PAuCl: Chloro(triethylphosphine) gold (I)
DMF: N,N-dimethylformamide
HOBt: 1-Hydroxybenzotriazole
WSC HCl: 1-Ethyl-3-(3-dimethylaminopropyl) carbodiimide hydrochloride
TMSOTf: Trimethylsilyl trifluoromethanesulfonate
THF: Tetrahydrofuran Reference Synthesis Example Synthesis of Compound A Penta-O-acetyl-β-D-glucopyranose (compound 1A) was used as a starting material to synthesize a compound A according to the following reaction formulae.

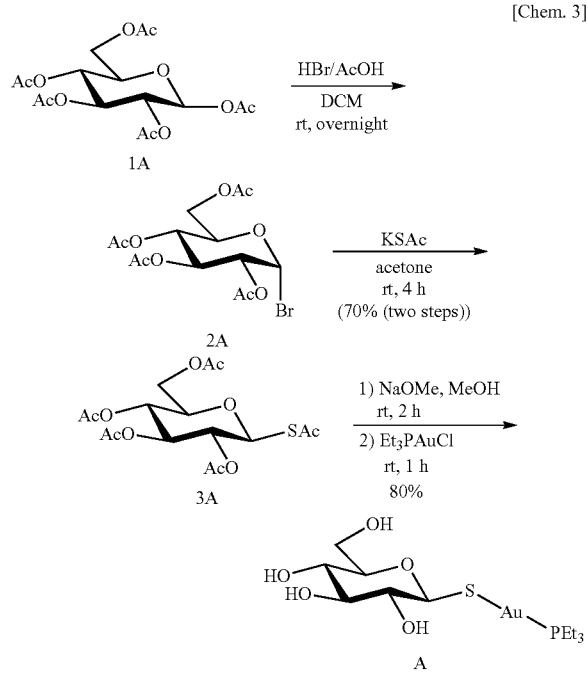

(1) Synthesis of Compound 2A

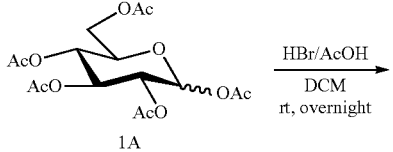

[Chem. 4]

The compound 1A (6.0 g, 15.4 mmol) and 36 mL of dichloromethane were charged into a 100 mL eggplant flask, and 6.0 mL of 25% hydrogen bromide-acetic acid was added thereto. After stirring all night at room temperature, 15 mL of water was added thereto to perform a liquid separation operation. The obtained organic layer was washed with 15 mL of saturated aqueous sodium bicarbonate and 15 mL of brine, dried with sodium sulfate, and concentrated.

Accordingly, 7.9 g of a colorless oily compound 2A was obtained. The process proceeded to the next step without further purification.

(2) Synthesis of Compound 3A

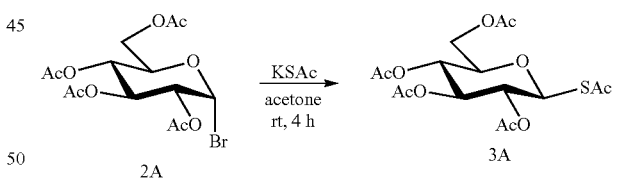

[Chem. 5]

The compound 2A (6.3 g), 30 mL of acetone, and KSAc (3.5 g, 30.7 mmol) were charged into a 100 mL kolben flask, and the mixture was stirred at room temperature for 4 hours. After concentrating the reaction solution, 50 mL of ethyl acetate and 30 mL of water were added thereto to perform a liquid separation operation. After collecting the organic layer, it was washed with 30 mL of brine and dried with sodium sulfate. By concentrating the solution, 6.7 g of a brown oily crude product was obtained. Purification was performed using 140 g of silica gel and a development solvent (heptane/ethyl acetate=2:1 to 3:2). After concentrating the target fraction, it was washed with 200 mL of heptane and filtered to obtain 3.9 g (a yield of 63% (2 steps)) of a light pink solid compound 3A.

(3) Synthesis of Compound A

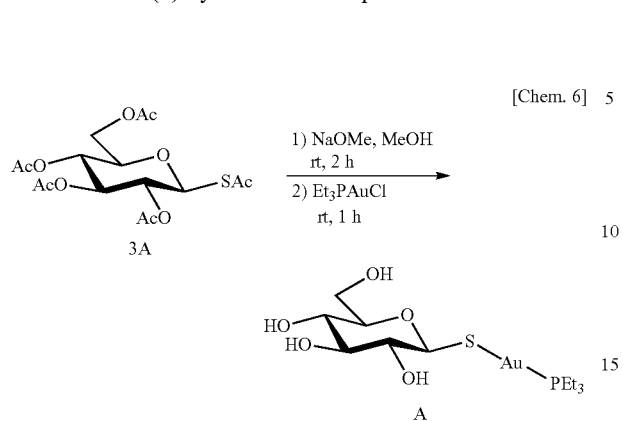

The compound 3A (1.5 g, 3.7 mmol) and 150 mL of methanol were charged into a 500 mL kolben flask, and 0.89 mL of a 5 M NaOMe methanol solution was added thereto at an internal temperature of 4° C. under ice-cooling. After stirring for 2 hours at room temperature, Et$_3$PAuCl (1.4 g, 4.0 mmol) were added thereto. After stirring for 1 hour at room temperature, the reaction solution was concentrated to obtain 688 mg of a colorless oily crude product. Purification was performed using 14.5 g of silica gel (1.5 g of adsorbed silica gel) and a development solvent (ethyl acetate/methanol=9:1 to 4:1), and the target fraction was concentrated. The concentrated residue was dissolved in 20 mL of methanol, 600 mg of activated carbon was added thereto, and the mixture was stirred for 1 hour and filtered with Celite to obtain a compound A ((1-thio-β-D-glucopyranoside) (S-triethylphosphine) gold (I)).

1.7 g (a yield of 63% (2 steps)) of a colorless amorphous compound A was obtained by combining the starting compound 3A (500 mg, 1.2 mmol) with the compound A obtained through the same method.

[Specific Rotation Measurement]

50.7 mg of the compound A was dissolved in methanol to make a volume of 5.00 mL. A cell with a cell length of 100 mm was used to measure the specific rotation 10 times, and an average value excluding the maximum and minimum values was obtained. The average value was +7.28 degrees.

Example 1

Synthesis of Compound B

L-(−)-glucose (compound 1B) was used as a starting material to synthesize a compound B according to the following reaction formulae.

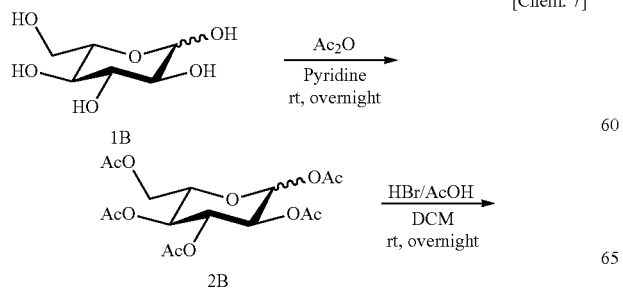

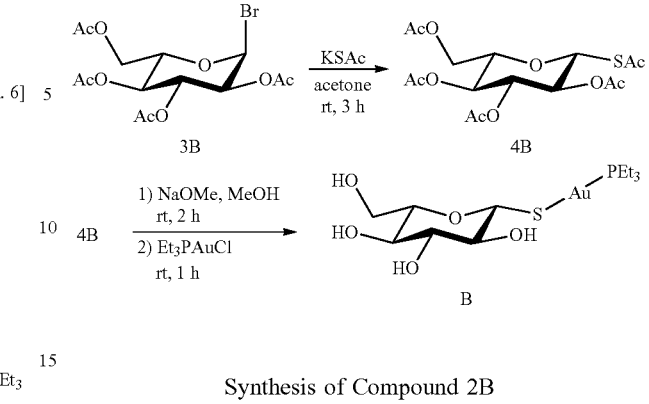

Synthesis of Compound 2B

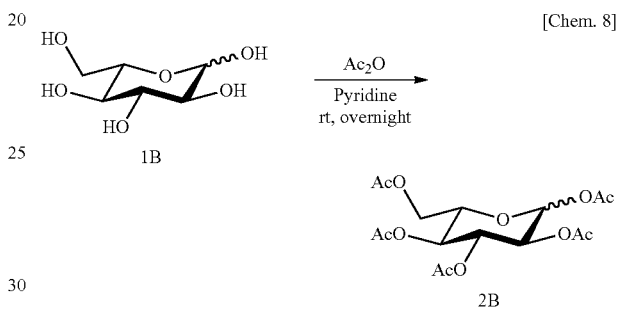

The compound 1B (5.0 g, 27.6 mmol) and 50 mL of pyridine were charged into a 200 mL eggplant flask, and 15.7 mL of acetic anhydride was added thereto. After stirring all night at room temperature, 200 mL of ethyl acetate and 100 mL of water were added thereto to perform a liquid separation operation. The obtained organic layer was washed with 50 mL of 1 M hydrochloric acid and 50 mL of brine and concentrated. Accordingly, 12.1 g of a colorless oily compound 2B was obtained. The process proceeded to the next step without further purification.

Synthesis of Compound 3B

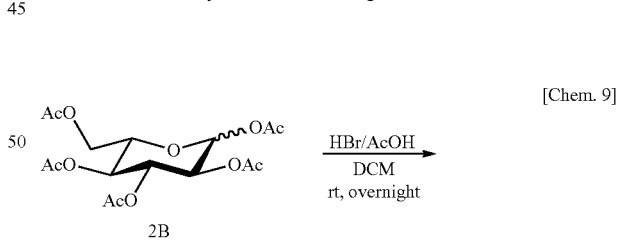

The compound 2B (12.1 g) and 60 mL of dichloromethane were charged into 200 ml eggplant flask, and 10 mL of 25% hydrogen bromide-acetic acid was added thereto. After stirring all night at room temperature, 100 mL of water and 100 mL of chloroform were added thereto to perform a liquid separation operation. The obtained organic layer was washed with 100 mL of saturated aqueous sodium bicarbonate and 100 mL of brine, dried with sodium sulfate, and concentrated. Accordingly, 15.9 g of a colorless oily compound 3B was obtained. The process proceeded to the next step without further purification.

Synthesis of Compound 4B

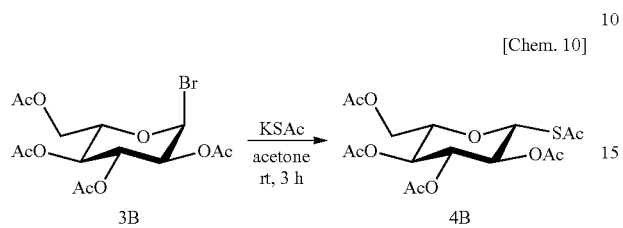

[Chem. 10]

The compound 3B (15.9 g), 55 mL of acetone, and KSAc (6.4 g, 55.6 mmol) were charged into a 300 mL eggplant flask, and the mixture was stirred at room temperature for 4 hours. After concentrating the reaction solution, 100 mL of ethyl acetate and 100 ml of water were added thereto to perform a liquid separation operation. After collecting the organic layer, it was washed with 30 mL of brine and dried with sodium sulfate. By concentrating the solution, 11.3 g of a brown oily crude product was obtained. Purification was performed with 200 g of silica gel and a development solvent (toluene/ethyl acetate=9:1 to 5:1) to obtain 5.1 g (a yield of 45% (3 steps)) of an orange solid compound 4B.

Synthesis of Compound B

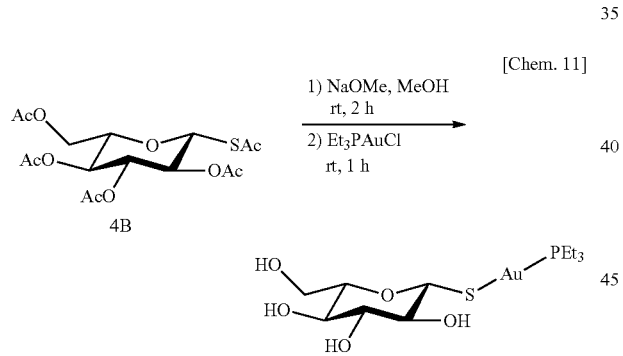

[Chem. 11]

The compound 4B (4.1 g, 10.1 mmol) and 100 mL of methanol were charged into a 300 mL kolben flask, and 2.42 mL of a 5 M NaOMe methanol solution was added thereto at an internal temperature of 4° C. under ice-cooling. After stirring for 2 hours at room temperature, Et$_3$PAuCl (3.18 g, 9.0 mmol) were added thereto. After stirring for 1 hour at room temperature, the reaction solution was concentrated to obtain 5.8 g of a colorless oily crude product. Purification was performed with 100 g of silica gel (6.0 g of adsorbed silica gel) and a development solvent (ethyl acetate/methanol=9:1 to 4:1) and the target fraction was concentrated to obtain 2.5 g (a yield of 49%) of a compound B ((1-thio-β-L-glucopyranoside) (S-triethylphosphine) gold (I)).

[Specific Rotation Measurement]

50.5 mg of the compound B was dissolved in methanol to make a volume of 5.00 mL. A cell with a cell length of 100 mm was used to measure the specific rotation 10 times at 20° C., and an average value obtained excluding the maximum and minimum values was-8.73 degrees. It was confirmed that the compound B was an L-form as compared with the specific rotation (+7.28 degrees) of the known D-form compound A.

Example 2

Synthesis of Compound C

The compound 4B of Example 1 was used as a starting material to synthesize a compound C according to the following reaction formulae.

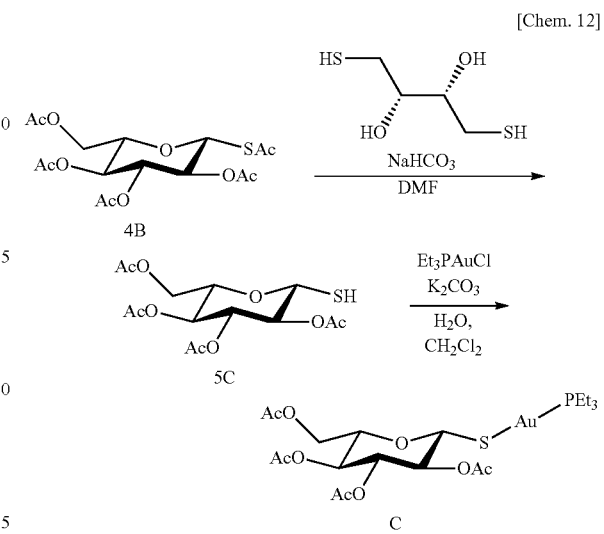

[Chem. 12]

(1) Synthesis of Compound 5C

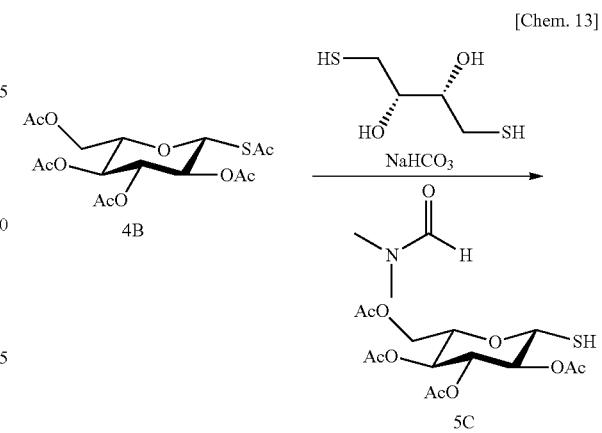

[Chem. 13]

The compound 4B (19.0 g) and DMF (19.0 mL) were charged into a 100 mL eggplant flask in an argon stream. NaHCO$_3$ (0.06 g) and (2S, 3S)-1,4-dimercaptobutane-2,3-diol (1.80 g) were added thereto, and the mixture was stirred at room temperature for 2 hours. After confirming disappearance of the raw materials through LC/MS, water/toluene (20 mL/20 mL) was added to the reaction solution to perform liquid separation. Anhydrous Na$_2$SO$_4$ was added to the organic layer, filtration was performed, and the filtrate was concentrated under reduced pressure using an evaporator to obtain a yellow solution (3.09 g). The process proceeded to the next step without further purification.

(2) Synthesis of Compound C

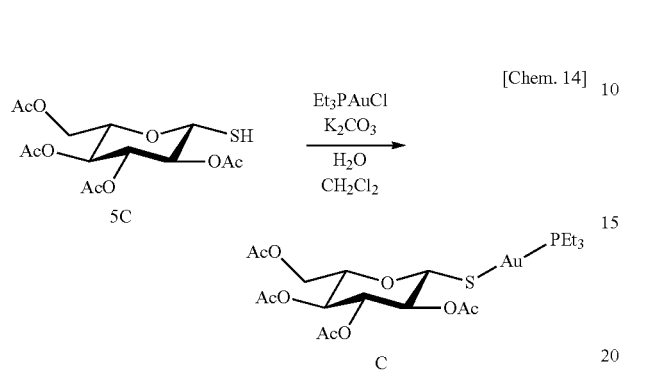

[Chem. 14]

The compound 5C (3.1 g), CH$_2$Cl$_2$ (14.0 mL), and water (14.0 mL) were charged into a 100 mL eggplant flask in an argon stream. Et$_3$PAuCl (1.6 g) and K$_2$CO$_3$ (0.77 g) were added thereto under ice-cooling. After returning to room temperature, the mixture was stirred for 1 hour. Water (30.0 mL) was added thereto, and extraction was performed twice with CH$_2$Cl$_2$ (30.0 mL). Anhydrous MgSO$_4$ was added thereto, the mixture was filtered, and the filtrate was concentrated under reduced pressure to obtain a yellow solution (3.6 g). The crude product (3.6 g) was purified with neutral silica gel (60-210 μm, 64 g) and a development solvent (heptane/ethyl acetate=1:1 to 1:3 and the target fraction was concentrated to obtain 2.03 g (a yield of 64%) of a white pink solid compound C ((2,3,4,6-tetra-O-acetyl-1-thio-β-L-glucopyranoside) (S-triethylphosphine) gold (I)).

[Specific Rotation Measurement]

101.2 mg of the compound C was dissolved in 10.0 mL of methanol to prepare a sample solution with a concentration of 1.01 mg/mL. A cell with a cell length of 100 mm was used to measure the specific rotation 10 times at 20° C., and an average value obtained excluding the maximum and minimum values was +56.1 degrees. It was confirmed that the compound C is an L-form because the specific rotation of auranofin, which is a D-form of the compound C, is −52 degrees (refer to Green Chemistry, 2015, 17, 4, 2545-2551).

Example 3

Synthesis of Compound D

L-(−)-glucose (compound 1B) was used as a starting material to synthesize a compound D according to the following reaction formulae.

[Chem. 15]

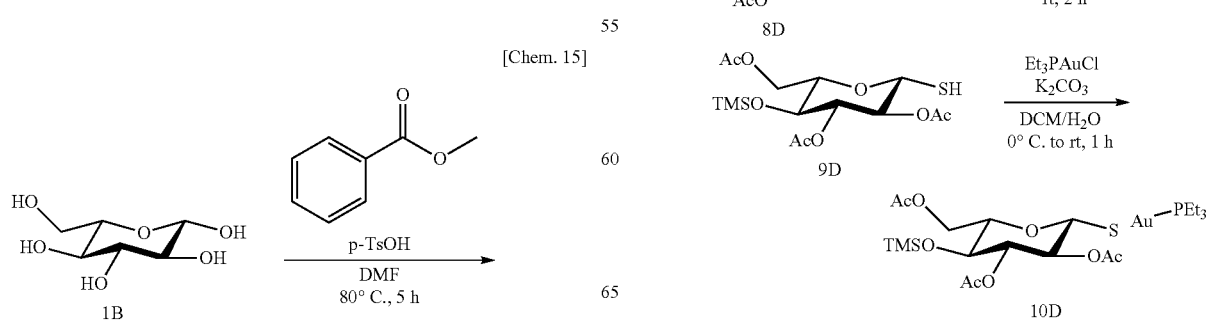

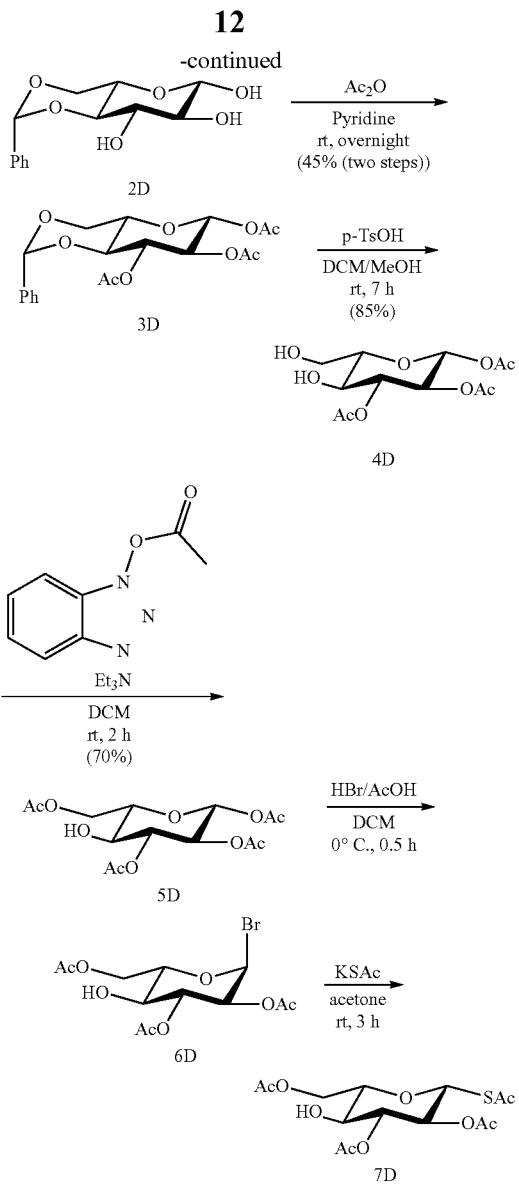

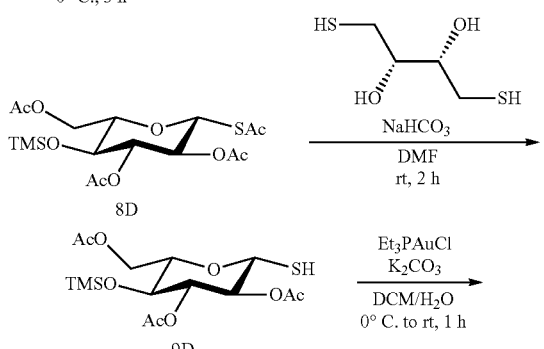

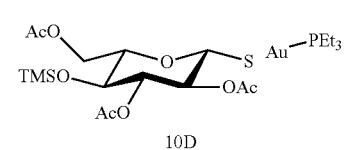

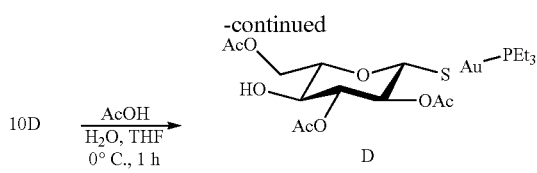

Synthesis of Compound 2D with 200 mL of 1 M hydrochloric acid. Furthermore, the organic layer was washed with 200 mL of saturated aqueous sodium bicarbonate. After the organic layer was dried with sodium sulfate, it was concentrated under reduced pressure. The concentrate was azeotropically distilled with 200 mL of toluene three times to obtain 56.1 g of a yellow solid crude product (compound 3D). The process proceeded to the next step without further purification.

Synthesis of Compound 4D

[Chem. 16]

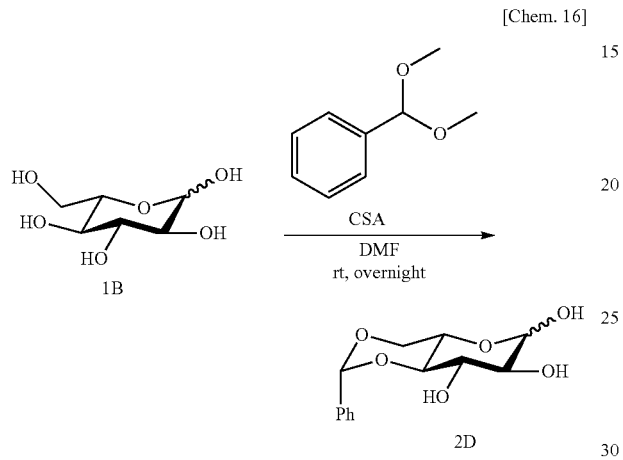

The compound 1B (23.0 g, 128 mmol) and 220 mL of DMF were charged into a 500 mL eggplant flask, and benzaldehyde dimethylacetal (22.3 g, 147 mmol) and CSA (2.97 g, 12.8 mmol) were added thereto. After stirring all night at room temperature, 10 mL of triethylamine was added thereto to stop the reaction. The reaction solution was concentrated under reduced pressure at a bath temperature of 60° C. to obtain 50.2 g of a yellow oily compound 2D. The process proceeded to the next step without further purification.

Synthesis of Compound 3D

[Chem. 17]

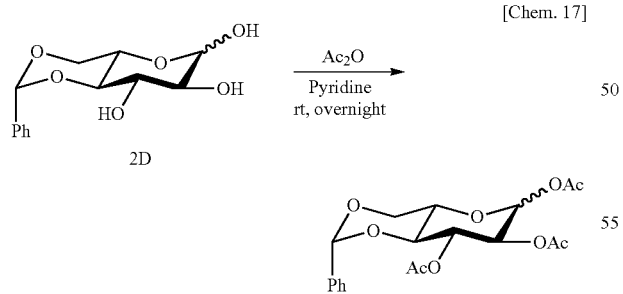

The compound 2D (50.2 g) and 300 mL of pyridine were charged into a 500 mL eggplant flask. 60.5 mL (640 mmol) of acetic anhydride was added thereto under ice-cooling. After stirring all night at room temperature, the reaction solution was poured into a mixed solution of 200 mL of ethyl acetate and 300 ml of water. After performing a liquid separation operation, the obtained organic layer was washed

[Chem. 18]

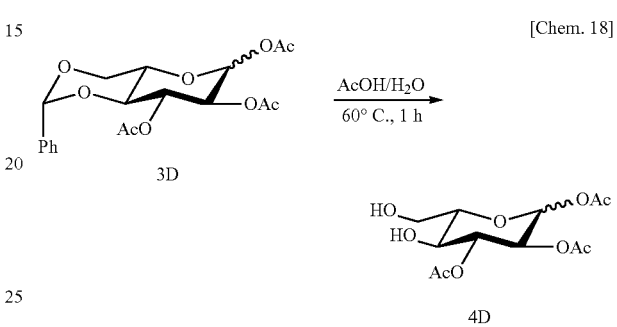

The compound 3D (56.1 g), 400 mL of acetic acid, and 100 ml of water were charged into a 1 L kolben flask and stirred at an internal temperature of 60° C. for 1 hour. After the reaction solution was concentrated under reduced pressure at a bath temperature of 50° C., 300 mL of chloroform and 400 mL of saturated aqueous sodium bicarbonate were added thereto to perform a liquid separation operation. Furthermore, extraction was performed 10 times with 100 mL of chloroform. The obtained organic layer was dried with magnesium sulfate and was then concentrated under reduced pressure to obtain 43.3 g of a brown oily crude product. Purification was performed using 900 g of silica gel and a development solvent (chloroform/methanol=100:0 to 95:5). The target fraction was concentrated and dried under reduced pressure at 40° C. to obtain 19.5 g of a white amorphous compound 4D.

Synthesis of AcOBt

[Chem. 19]

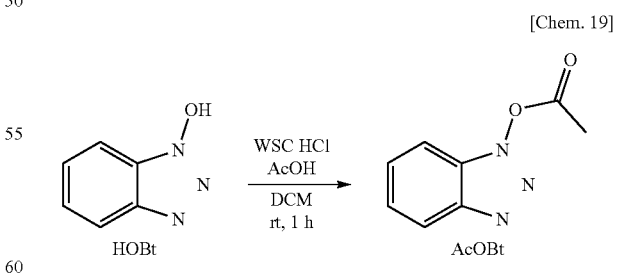

HOBt (10.3 g, 76.0 mmol) and 100 mL of dichloromethane were charged into a 300 mL eggplant flask in an argon atmosphere, and WSC HCl (15.3 g, 79.8 mmol) and acetic acid (4.78 mL, 83.6 mmol) were added thereto. After stirring at room temperature for 1 hour, the stirred mixture was used for synthesis of a compound 5D.

Synthesis of Compound 5D

[Chem. 20]

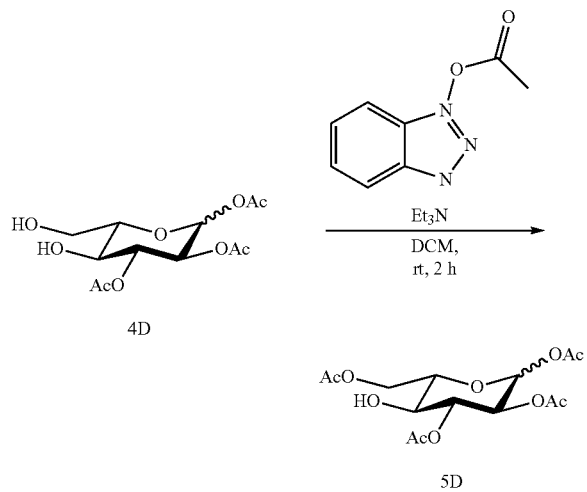

The compound 4D (19.4 g, 63.3 mmol) and 200 mL of dichloromethane were charged into a 500 mL kolben flask in an argon atmosphere, and triethylamine (11.0 mL, 76.0 mmol) was added thereto. AcOBt was added dropwise thereto under at an internal temperature of 40° C. ice-cooling. At this time, the internal temperature was raised to 60° C. After stirring at room temperature for 2 hours, 200 ml of water was added thereto to perform a liquid separation operation. Furthermore, extraction was performed three times with 100 mL of dichloromethane. The obtained organic layer was dried with magnesium sulfate and concentrated under reduced pressure to obtain 29.1 g of a yellow oily crude product. Purification was performed using 600 g of silica gel and a development solvent (heptane/ethyl acetate=1:1 to 1:2). The target fraction was concentrated under reduced pressure at 40° C. and dried to obtain 13.2 g (a yield of 60%) of a colorless oily compound 5D.

Synthesis of Compound 6D

[Chem. 21]

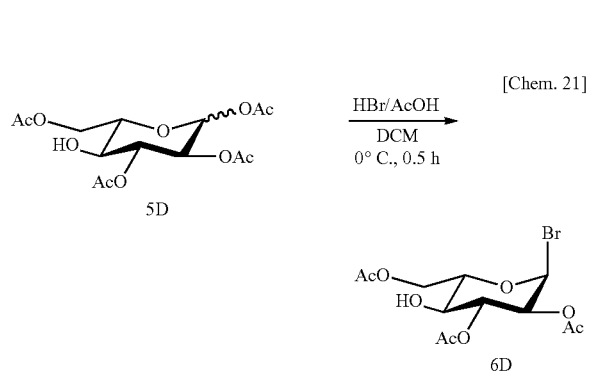

The compound 5D (8.5 g, 24.4 mmol) and 60 mL of dichloromethane (super dehydrated) were charged into a 300 mL eggplant flask in an argon atmosphere. 30 mL of 30% hydrogen bromide-acetic acid was added dropwise thereto at an internal temperature of 4° C. under ice-cooling. After stirring at the same temperature for 30 minutes, the reaction solution was poured into 30 mL of ice water. After a liquid separation operation was performed, extraction was performed twice with 30 mL of dichloromethane. The obtained organic layer was dried with magnesium sulfate, and was then concentrated under reduced pressure at a bath temperature of 30° C. Accordingly, 10.5 g of a colorless oily compound 6D was obtained. The process proceeded to the next step without further purification.

Synthesis of Compound 7D

[Chem. 22]

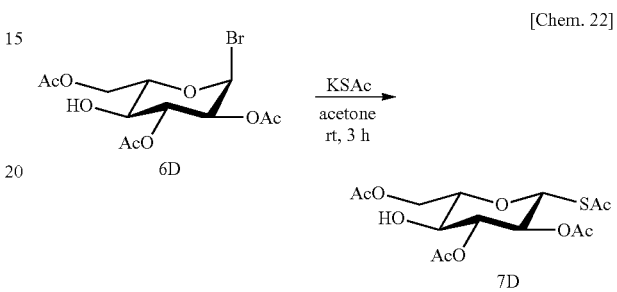

The compound 6D (10.5 g), 90 mL of acetone, and KSAc (3.1 g, 26.8 mmol) were charged into a 300 mL eggplant flask, and the mixture was stirred at room temperature for 3 hours. After concentrating the reaction solution, 200 mL of ethyl acetate and 100 ml of water were added thereto to perform a liquid separation operation. Furthermore, after extraction was performed with 100 mL of ethyl acetate, the organic layer was dried with sodium sulfate. The solution was concentrated under reduced pressure to obtain 7.6 g of a brown oily crude product. Purification was performed with 160 g of silica gel and a development solvent (toluene/ethyl acetate=4:1 to 2:1) to obtain 4.4 g (a yield of 50% (2 steps)) of a yellow solid compound 7D.

Synthesis of Compound 8D

[Chem. 23]

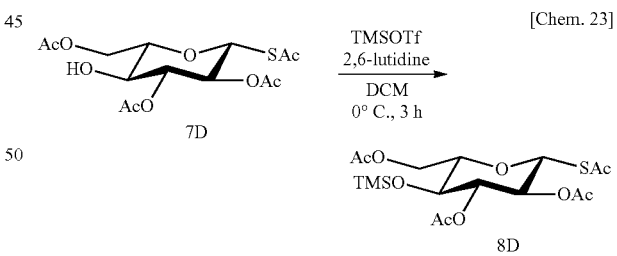

The compound 7D (150 mg, 0.412 mmol) and 2.0 mL of dichloromethane were charged into a 30 mL eggplant flask in an argon atmosphere. 2,6-Lutidine (88.2 mg, 0.823 mmol) and TMSOTf (0.10 mL, 0.535 mmol) were added thereto under ice-cooling and stirred at the same temperature for 3 hours. The reaction solution was poured into a mixed solution of 10 mL of chloroform and 10 ml of water, and a liquid separation operation was performed. The obtained organic layer was dried with magnesium sulfate. This organic layer was concentrated under reduced pressure to obtain 300 mg of an oily crude product. Purification was performed with 10 g of silica gel and a development solvent (heptane/ethyl acetate=4:1 to 2:1) to obtain 115 mg (a yield of 64%) of a colorless solid compound 8D.

Synthesis of Compound 9D

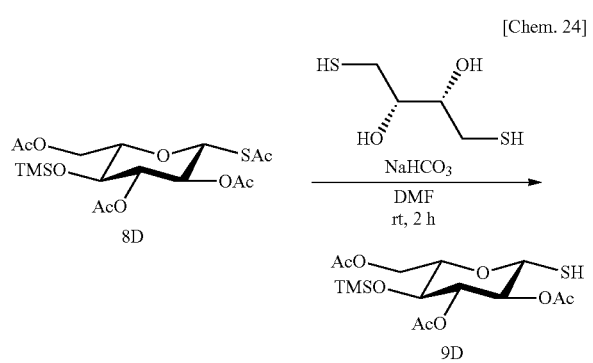

[Chem. 24]

The compound 8D (111 mg, 0.254 mmol) and 1.0 mL of DMF were charged into a 30 mL eggplant flask, and sodium bicarbonate (3.2 mg, 0.038 mmol) and dithiothreitol (66.7 mg, 0.432 mmol) were added thereto. After stirring at room temperature for 2 hours, 10 mL of toluene and 10 mL of water were added thereto to perform a liquid separation operation. Furthermore, extraction was performed twice with 10 mL of toluene. After the obtained organic layer was dried with magnesium sulfate, the solution was concentrated under reduced pressure. Accordingly, 140 mg of a yellow oily compound 9D was obtained. The process proceeded to the next step without further purification.

Synthesis of Compound 10D

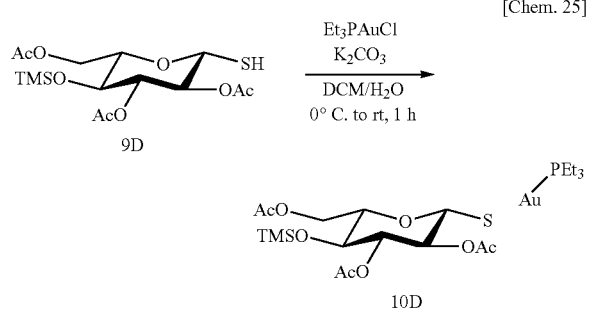

[Chem. 25]

The compound 9D (140 mg), 1.0 mL of dichloromethane, and 1.0 mL of water were charged into a 30 mL eggplant flask. Potassium carbonate (40 mg, 0.305 mmol) and Et$_3$PAuCl (90 mg, 0.267 mmol) were added thereto under ice-cooling. After stirring at room temperature for 1 hour, 10 mL of chloroform and 10 ml of water were added thereto to perform a liquid separation operation. The obtained organic layer was dried with magnesium sulfate and was then concentrated under reduced pressure to obtain 300 g of an oily crude product. Purification was performed using 10 g of silica gel and a development solvent (heptane/ethyl acetate=4:1 to 1:1). The target fraction was concentrated and dried to obtain 55.7 g (a yield of 32% (2 steps)) of a colorless oily compound 10D. Furthermore, 41.9 mg (a yield of 65%) of the compound 14 was collected.

Synthesis of Compound D

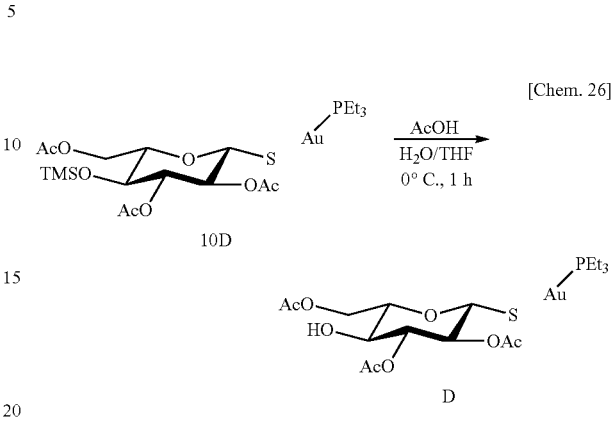

[Chem. 26]

1.0 mL of water and 0.10 mL of acetic acid were charged into a 30 mL eggplant flask. A THF solution (1.0 mL) of the compound 10D (29.0 mg, 0.041 mmol) was added dropwise thereto under ice-cooling. After stirring at the same temperature for 1 hour, 10 mL of ethyl acetate and 10 mL of saturated aqueous sodium bicarbonate were added to the reaction solution to perform a liquid separation operation. The obtained organic layer was dried with magnesium sulfate and was then concentrated under reduced pressure to obtain 24.4 mg (a yield of 94%) of a compound D ((2,3,6-tri-O-acetyl-1-thio-β-L-glucopyranoside) (S-triethylphosphine) gold (I)).

<Evaluation of Compounds>

The compounds obtained in the Examples were subjected to the tests shown below.

[RF Wave Irradiation Test]

In order to confirm a temperature rise effect due to the L-glucose derivative of the present invention, a radio wave (RF wave) irradiation test was performed using an RF wave irradiation unit 10 shown in FIG. 1. The RF wave irradiation unit 10 includes a high frequency generator 1, an upper electrode 3 and a lower electrode 5 connected to the high frequency generator 1, and an electromagnetic shield 7 for shielding electromagnetic waves generated between the upper electrode 3 and the lower electrode 5. When a sample S is placed between the upper electrode 3 and the lower electrode 5 and an electromagnetic wave (RF wave) is applied between the upper electrode 3 and the lower electrode 5, a line of electric force LEF is generated and an RF wave irradiation test can be performed. The RF wave irradiation condition was a frequency of 13.56 MHz.

An optical fiber thermometer FL-2000 (manufactured by Anritsu Meter Co., Ltd.) was used to accurately measure the temperature of the sample S during RF irradiation. A distal end of a temperature sensor FS100 (manufactured by Anritsu Meter Co., Ltd.) was inserted into a central portion of the sample S to measure the temperature of the sample S.

As the sample S, a water-containing gel containing the compound D ((2,3,6-tri-O-acetyl-1-thio-β-L-glucopyranoside) (S-triethylphosphine) gold (I)) at a predetermined gold atom concentration 0 ppm and 308.9 ppm as gold atoms) was used. The water-containing gel is a model of a biological tissue, and the compound D is an L-glucose derivative containing gold atoms.

Specifically, a sample in which a gel containing the compound D was enclosed in a polystyrene container was used as the sample S. The sample was prepared according to the following procedure. A water-containing gel containing the compound D at a predetermined concentration was enclosed in a polystyrene container so that the distance between electrodes when the water-containing gel was sandwiched between the upper electrode 3 and the lower electrode 5 became 28 mm.

Regarding a case where the water-containing gel contains no compound D (0 ppm as gold atoms) and a case where the water-containing gel contains the compound (308.9 ppm as gold atoms), temperature rising rates (° C./min) were obtained from the time required for increasing the temperature from 30° C. to 35° C. In the case where the water-containing gel contained no compound D, the temperature rising rate was 2.5 (° C./min) on average and the standard error SE was 0.06° C. In the case where the water-containing gel contained the compound D, the temperature rising rate was 2.9 (° C./min) on average and the standard error SE was 0.12° C. From these results, it was possible to confirm that the temperature rising rate increased in the case where the water-containing gel contained the compound D compared to the case where the water-containing gel contained no compound D.

<L-Glucose Derivative Administration Test>

A mouse pancreatic β-cell tumorigenic (insulinoma) cell line MIN6 (Miyazaki J. et al., Endocrinology 127:126-132, 1990) was used to perform the following experiment. Here, all experiments which include an experiment where the above-described compound B (hereinafter called LGG) is administered and an experiment where the above-described compound A (hereinafter called DGG) is administered and in which about 1,000 MIN6 cells were placed in 96 wells were carried out by taking care to avoid external disturbances as much as possible.

MIN6 cells derived from mouse pancreas are a heterogeneous cell population (Yamato, E. et al., PLOS One 8: e61211, 2013). Up to about 4 to 5 DIV after the start of culture, normal cells, that is, insulin-producing β-cells of pancreatic islets of Langerhans accounted for the majority. Although there are some cells exhibiting properties of malignant cells in terms of pathology, the percentage is small. On the other hand, it is estimated that the proportion of malignant cells increases when the number of culture days passes, for example, 10 DIV and the overall cell condition deteriorates (Sasaki, A. et al. Human Cell 2016, 29, 37-45).

LGG was administered in vitro to MIN6 at 4 days in vitro (DIV) in culture. LGG is an L-glucose derivative in which the 1-OH group of L-glucose is substituted with —SAuP ($C_2H_5$)$_3$ group. An experiment in which DGG was administered was also carried out as a control experiment. DGG is a D-glucose derivative in which the 1-OH group of D-glucose is substituted with —SAuP($C_2H_5$)$_3$ group.

Figure 2:
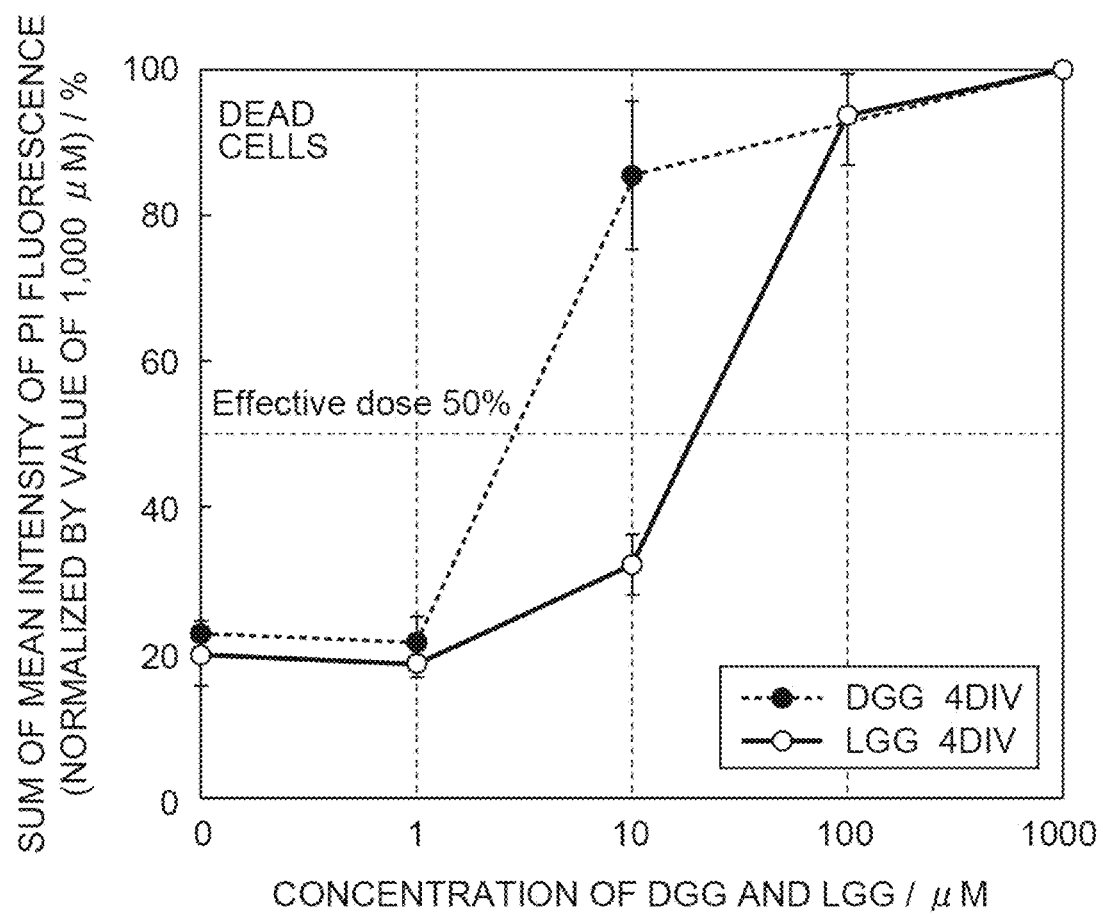
FIG. 2 is a graph illustrating a proportion of the number of dead cells when LGG is administered to MIN6 at 4 days in vitro (DIV) in culture.

Specifically, LGG and DGG were administered to MIN6 at 0 to 1,000 μm at 4 DIV in culture, and after the elapse of 90 minutes, the proportion of the number of dead cells evaluated using a dead cell marker propidium iodide (PI) was measured as a function of their concentrations. The results thereof are shown in FIG. 2. In FIG. 2, the horizontal axis shows a concentration of DGG or LGG, and the vertical axis shows the sum of mean intensity of PI fluorescence for each cell. However, the vertical axis is a value (%) normalized by the fluorescence intensity of the total number of cells assuming that the number of dead cells at a concentration of 1,000 μm is the total number of cells in each well. The broken line is an eye guide.

From the interpolation of FIG. 2, it is estimated that, if the concentration of DGG administered exceeds about 1 μm, cell death evaluated using PI becomes detectable at least according to the criteria used in this experiment. DGG is a well-known compound, and it is thought that its cytotoxicity is due to gold atoms (Au) that have entered cells (Sutton B. M. et al., J. Med. Chem. 15:1095-98, 1972, Wu, B. et al., J. Med. Chem. 62:7751-68, 2019). From FIG. 2, the concentration of DGG at which the cells exhibit a 50% effective dose for nuclear abnormality evaluated using PI is observed to be between 1 μm and 10 μm.

On the other hand, it is estimated that, if the concentration of LGG administered exceeds 10 μm, cell death evaluated using PI becomes detectable. Under this experimental condition, since the concentration of DGG exhibiting a 50% effective dose was observed between 10 μm and 100 μm, it is estimated that LGG is approximately 10 times (approximately one order of magnitude) safer than DGG against normal cells such as β-cell lines of pancreatic islets of Langerhans.

Here, a further experiment was carried out to verify whether the LGG-induced cell death clearly shown in FIG. 2 was indeed caused by the intracellular uptake of LGG. Specifically, whether the cell death is inhibited was examined by administering LGG in the presence of phloretin (hereinafter called PHT).

PHT functions as an inhibitor on various membrane transport proteins such as water channel proteins or glucose transporter proteins (Ono K. et al., Cancers 12:850, 2020). The fact that the effect of a certain substance (here, LGG) is "inhibition by PHT" suggests that the substance (that is, LGG) was at least partially transported into cells via the above-described membrane transport proteins and its transportation was inhibited by PHT (Ono K. et al., Cancers 12:850, 2020). That is, it is estimated that, when an L-glucose derivative is applied to MIN6 cells in the presence of PHT, incorporation of LGG into "cells into which the L-glucose derivative can be incorporate" which are partially present in a heterogeneous cell population is inhibited by the effect of inhibiting a non-transporter type transport mechanism by PHT.

Figure 3:
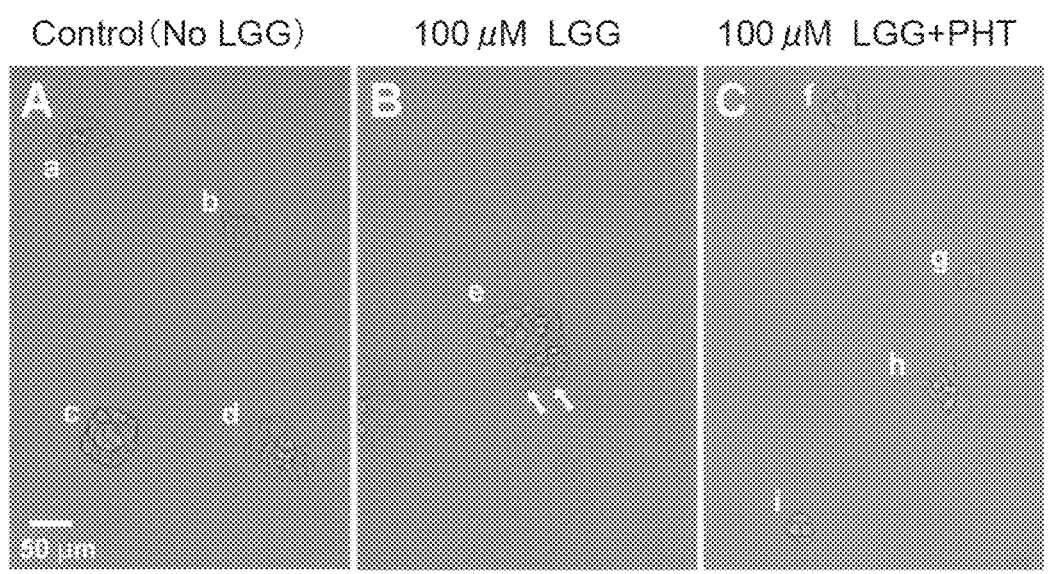
FIG. 3 shows representative photomicrographs of cells in which (A) shows MIN6 at 5 DIV in culture, (B) shows cells obtained by administering LGG to MIN6 at 5 DIV in culture, and (C) shows cells obtained by administering LGG to MIN6 at 5 DIV in culture after pre-administering PHT in advance.

As a specific experiment, regarding a case (A) where LGG was not administered to MIN6 at 5 DIV in culture (control experiment), a case (B) where 100 μm LGG was administered thereto for 10 minutes, and a case (C) where 100 μm LGG was administered thereto for 10 minutes after 150 μm PHT was administered in advance, cell conditions were observed using an optical microscope. The results are shown in FIGS. 3A to 3C, and enlarged views of a to i in FIG. 3 are shown in FIGS. 4a to 4i (the scales of the enlarged views are all the same).

Figure 4:
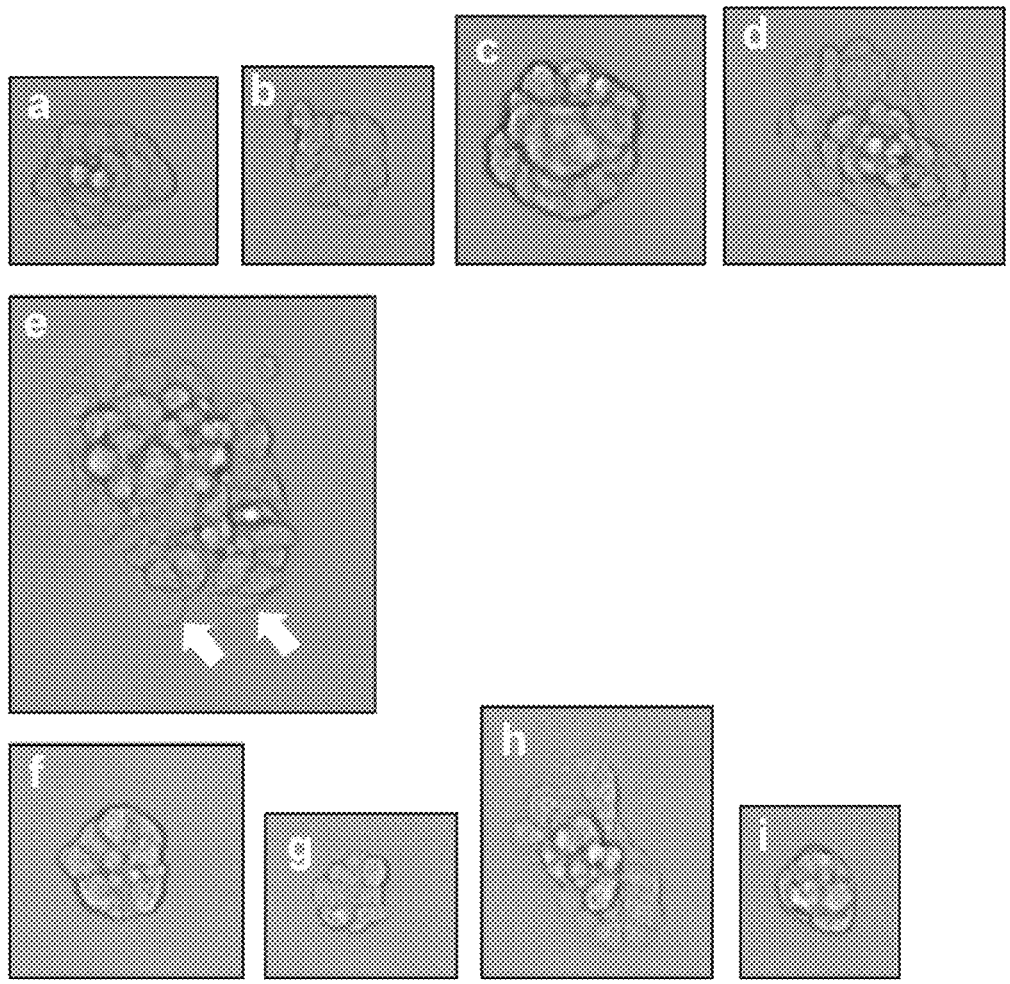
FIG. 4 shows enlarged views of the photomicrographs of FIG. 3.

In FIG. 3B and FIG. 4e which is an enlarged view of FIG. 3B, a characteristic form in which a part of cytoplasm in some cells protrudes outside the cells (refer to arrows). Such a form was not observed in FIG. 3A and FIGS. 4a to 4d which are enlarged views of FIG. 3A, and this suggests deterioration of the cell conditions. On the other hand, in FIG. 3C and FIGS. 4f to 4i which are enlarged views of FIG. 3C, cells indicating deterioration of the cell conditions are hardly recognized.

Figure 5:
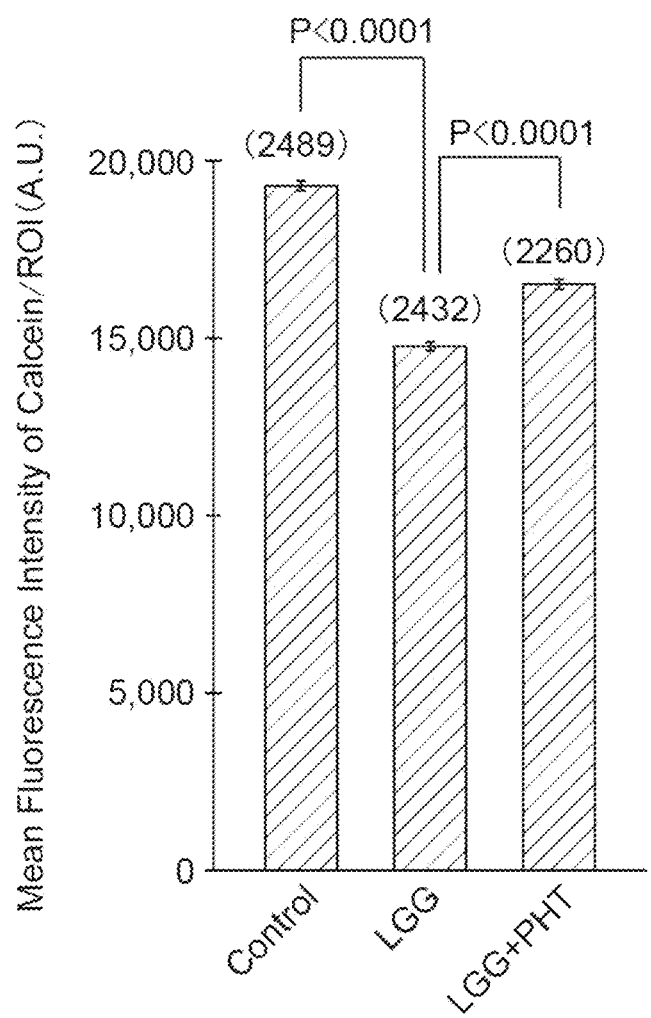
FIG. 5 shows a graph illustrating results of evaluating fluorescence intensity of calcein which is a fluorescent marker representing activities of living cells when LGG is administered in the presence or absence of PHT.

Furthermore, the effect of LGG on cells was quantitatively analyzed in the presence or absence of PHT. Specifically, similarly to the cases of FIG. 3 described above, the fluorescence intensity of calcein, which is a fluorescent marker representing activities of living cells, was evaluated for the case (A) where LGG was not administered to MIN6 (at 5 DIV) (control experiment), the case (B) where 100 μm LGG was administered thereto for 10 minutes (LGG), and the case (C) where 100 μm LGG was administered thereto for 10 minutes after 150 μm PHT was administered in advance. The results thereof are shown in FIG. 5. In FIG. 5, the error bars indicate standard errors SE, and the numerical values in parentheses indicate the number of ROIs analyzed.

The fluorescence intensity of calcein reflects an activity of esterase which is an intracellular hydrolase, and a decrease in fluorescence intensity of calcein indicates deterioration of cell conditions. The vertical axis of the drawing indicates mean fluorescence intensity (arbitrary unit, A.U.) of calcein per region of interest (ROI) set on cells. Bonferroni-Dunn test was used for statistical analysis.

It can be seen from a comparison between experimental groups of a left bar (control) and a middle bar (LGG) in FIG. 5 that LGG significantly reduced activities of MIN6 cells. Furthermore, it is clear from a comparison between experimental groups of the middle bar (LGG) and a right bar (LGG+PHT) that the decrease in cell activity due to LGG was significantly inhibited by PHT.

The same experiment was repeated three times with similar results. This suggests that at least a part of LGG acted on MIN6 cells through a mechanism inhibited by PHT to reduce their cell activities. The most probable mechanism is that there is a possibility that LGG may enter cells via "channel-like membrane transport proteins inhibited by PHT" (Sasaki A. et al., Human Cell 2016, 29, 37-45) to reduce cell activities. As already described, it is suggested that tumor cells exhibiting such channel-like proteins may partially coexist with MIN6 cells and that LGG may be incorporated into such tumor cells to attenuate activities of the cells and kill the cells.

Figure 6:
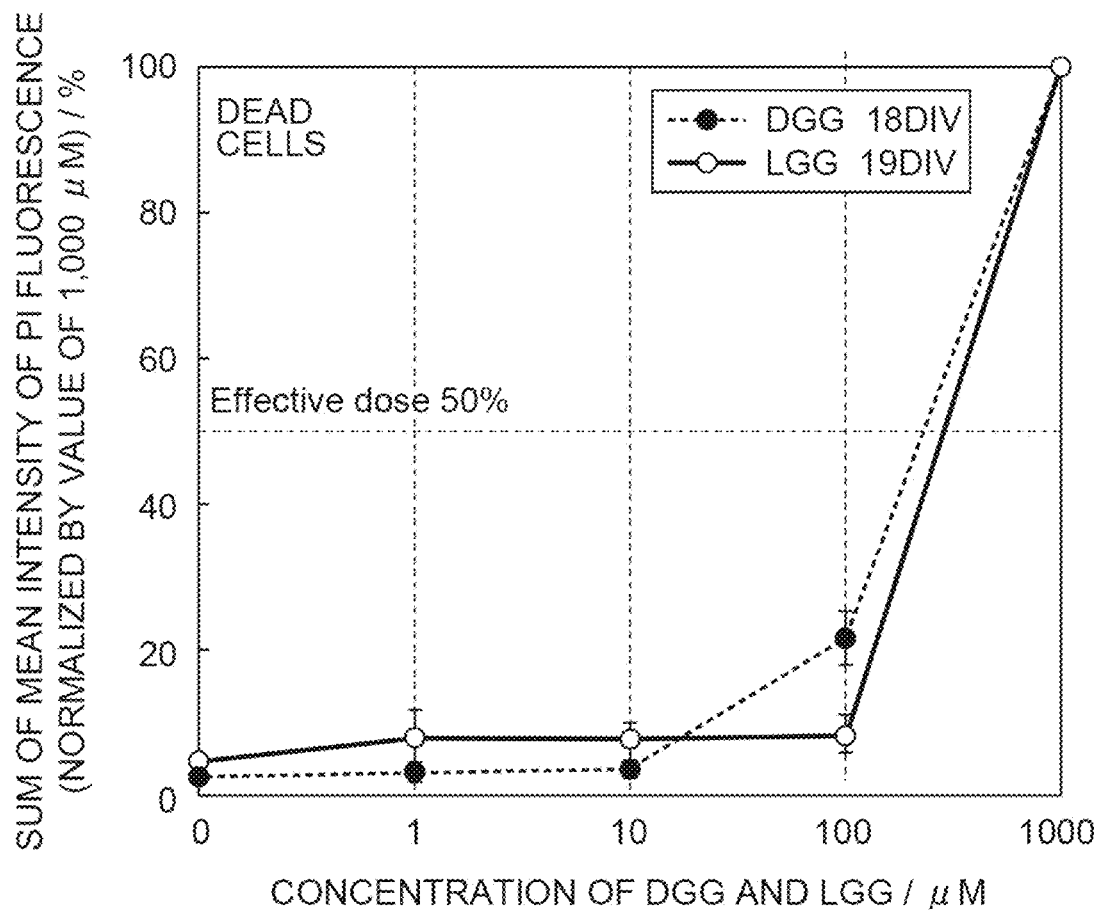
FIG. 6 is a graph illustrating a proportion of the number of dead cells when LGG is administered to MIN6 at 19 DIV in culture.

Furthermore, the same experiment as that of FIG. 2 was carried out for MIN6 at long DIV in culture. Results of 18 DIV for DGG and 19 DIV for LGG are shown in FIG. 6. However, in either case, observations were carried out after DGG or LGG was administered for 10 minutes. The plot shows the proportion of the number of dead cells.

It can be seen from these results that, in a case of long DIV, the LGG concentration dependence of the proportion of the number of dead cells when LGG is administered almost matches the DGG concentration dependence of the proportion of the number of dead cells when DGG is administered. Based on the fact that the proportion of dead cells is increasing and the culture environment is deteriorating in the first place in MIN6 cells at 18 to 19 DIV in culture, it is estimated that the proportion of malignant tumor cells occupying surviving cells is relatively increasing. For such a cell group, LGG caused significantly more cell death.

The above-described results suggest that at least a part of LGG, which is much less toxic than DGG to normal cells, is selectively incorporated into cancer cells, and probably after the incorporation, gold atoms (Au) exhibit significant toxicity to cancer cells.

REFERENCE SIGNS LIST

1 High frequency generator
3 Upper electrode
5 Lower electrode
7 Electromagnetic shield
10 RF wave irradiation unit

S Sample
LEF Line of electric force

The invention claimed is:

1. An L-glucose derivative represented by General Formula (1):

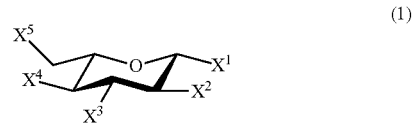

wherein $X^1$ represents a —$SAuR^1$ group, and $X^2$, $X^3$, $X^4$ and $X^5$ each independently represent an —$OR^2$ group, an —$NH_2$ group, or a fluorine atom; and $R^1$ represents a phosphine and $R^2$ represents a hydrogen atom, an alkyl group, an alkenyl group, an alkynyl group, an aryl group, or an acyl group.

2. The L-glucose derivative according to claim 1, wherein $X^2$, $X^3$, $X^4$ and $X^5$ each independently represent an —$OR^2$ group.

3. The L-glucose derivative according to claim 1, wherein $R^1$ is a trialkylphosphine.

4. The L-glucose derivative according to claim 1, wherein $R^1$ is triethylphosphine.

5. The L-glucose derivative according to claim 2, wherein $R^2$ is a hydrogen atom, an alkyl group, or an acyl group.

6. The L-glucose derivative according to claim 3, wherein $X^2$, $X^3$, $X^4$ and $X^5$ each independently represent an —$OR^2$ group, and $R^2$ is a hydrogen atom, an alkyl group, or an acyl group.

7. The L-glucose derivative according to claim 4, wherein $R^2$ is a hydrogen atom, an alkyl group, or an acyl group.

8. The L-glucose derivative according to claim 5, wherein a number of carbon atoms in the —$OR^2$ group is 1 to 10.

9. The L-glucose derivative according to claim 6, wherein a number of carbon atoms in the —$OR^2$ group is 1 to 10.

10. An L-glucose derivative represented by General Formula (1):

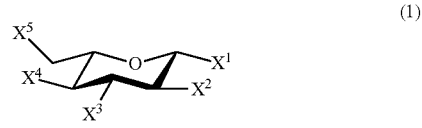

wherein $X^1$ represents a —$SAuR^1$ group, and $X^2$, $X^3$, $X^4$ and $X^5$ each independently represent an —$OR^2$ group, an —$NH_2$ group, or a fluorine atom; and $R^1$ represents a trialkylphosphine ligand and $R^2$ represents a hydrogen atom or an acyl group with 1 to 10 carbons.

11. The L-glucose derivative according to claim 10, wherein $R^1$ represents a triethylphosphine ligand and $R^2$ represents a hydrogen atom or an acetyl group.

12. A method of treating a patient diagnosed with pancreatic cancer, brain tumors, breast cancer, or uterine cancer, the method comprising administering an effective dose of the L-glucose derivative of claim 1.

13. The method according to claim 12, wherein the patient is diagnosed with pancreatic cancer.

* * * * *